(12) United States Patent
Xiao

(10) Patent No.: US 10,316,418 B2
(45) Date of Patent: Jun. 11, 2019

(54) EXCESS MICRO-BUBBLE HYDROGEN PREPARATION DEVICE

(71) Applicant: DALIAN SHUANGDI INNOVATIVE TECHNOLOGY RESEARCH INSTITUTE CO., LTD., Dalian, Liaoning (CN)

(72) Inventor: Zhibang Xiao, Dalian (CN)

(73) Assignee: DALIAN SHUANGDI INNOVATIVE TECHNOLOGY RESEARCH INSTITUTE CO., LTD., Dalian (CN)

( * ) Notice: Subject to any disclaimer, the term of this patent is extended or adjusted under 35 U.S.C. 154(b) by 67 days.

(21) Appl. No.: 15/301,479

(22) PCT Filed: Apr. 10, 2015

(86) PCT No.: PCT/CN2015/076245
§ 371 (c)(1),
(2) Date: Oct. 3, 2016

(87) PCT Pub. No.: WO2015/154712
PCT Pub. Date: Oct. 15, 2015

(65) Prior Publication Data
US 2017/0029965 A1 Feb. 2, 2017

(30) Foreign Application Priority Data
Apr. 12, 2014 (CN) .......................... 2014 1 0150468

(51) Int. Cl.
*C25B 13/02* (2006.01)
*B01D 69/02* (2006.01)
(Continued)

(52) U.S. Cl.
CPC .............. *C25B 13/02* (2013.01); *B01D 69/02* (2013.01); *B01D 69/06* (2013.01); *C25B 1/10* (2013.01);
(Continued)

(58) Field of Classification Search
CPC .... C25B 1/02–1/12; C25B 9/08; C25B 11/12; C25B 11/0484; C25B 13/00;
(Continued)

(56) References Cited

U.S. PATENT DOCUMENTS 3,410,770 A * 11/1968 Buechler .................. C25B 1/04
204/234
4,786,386 A * 11/1988 Rumeau ............... B01D 61/145
204/516
(Continued)

FOREIGN PATENT DOCUMENTS

CN 202785756 U 3/2013
CN 103936108 A 7/2014
(Continued)

OTHER PUBLICATIONS

Jul. 9, 2015 International Search Report issued in International Patent Application No. PCT/CN2015/076245.
(Continued)

*Primary Examiner* — Ciel P Thomas
(74) *Attorney, Agent, or Firm* — Oliff PLC

(57) ABSTRACT

The present invention relates an excess microbubble hydrogen preparation device, which belongs to the technical field of electrolysis equipment. The device comprises a water container which is respectively provided with a water inlet and a water outlet; at least one pair of a cathode and an anode are arranged within the water container; a water-permeable porous membrane is clamped between the coupled cathode and anode with no gap; the area of the inside of the water-permeable porous membrane opposite the cathode or the anode is smaller than the area of the inside of the cathode or the anode opposite the water-permeable porous membrane, and the thickness of the water-permeable porous membrane is less than 5 mm. The device can generate
(Continued)

massive amounts of ultraultra-micro bubble hydrogen, and at the same time, very little oxygen is generated.

13 Claims, 1 Drawing Sheet

(51) Int. Cl.
| | |
|---|---|
| B01D 69/06 | (2006.01) |
| C25B 1/10 | (2006.01) |
| C25B 9/08 | (2006.01) |
| C25B 11/04 | (2006.01) |
| C25B 11/12 | (2006.01) |
| C25B 13/00 | (2006.01) |

(52) U.S. Cl.
CPC ............ *C25B 9/08* (2013.01); *C25B 11/0415* (2013.01); *C25B 11/0473* (2013.01); *C25B 11/0484* (2013.01); *C25B 11/12* (2013.01); *C25B 13/00* (2013.01); *B01D 2325/027* (2013.01); *B01D 2325/04* (2013.01); *Y02E 60/366* (2013.01)

(58) Field of Classification Search
CPC ........ C25B 13/02; B01D 69/02; B01D 69/06; B01D 2325/027; B01D 2325/04; Y02E 60/366
See application file for complete search history.

(56) References Cited

U.S. PATENT DOCUMENTS

| | | | | |
|---|---|---|---|---|
| 6,235,186 B1* | 5/2001 | Tanaka | ................ | C02F 1/46109 204/253 |
| 2005/0023227 A1* | 2/2005 | Rychen | ................. | C02F 1/4674 210/748.2 |
| 2005/0173262 A1* | 8/2005 | Nakanishi | ........... | C02F 1/46104 205/743 |
| 2011/0064624 A1* | 3/2011 | McGee | ..................... | C02F 1/72 422/187 |
| 2014/0023724 A1* | 1/2014 | Fujimura | .............. | C02F 1/4678 424/600 |
| 2015/0144132 A1 | 5/2015 | Satoh et al. | | |
| 2015/0368815 A1* | 12/2015 | Iwai | ........................ | C25B 11/03 204/272 |

FOREIGN PATENT DOCUMENTS

| | | |
|---|---|---|
| CN | 103938219 A | 7/2014 |
| CN | 203833682 U | 9/2014 |
| CN | 203834031 U | 9/2014 |
| TW | 201410281 A | 3/2014 |
| WO | 2006/126737 A1 | 11/2006 |

OTHER PUBLICATIONS

Oct. 12, 2016 International Preliminary Report on Patentability issued in International Patent Application No. PCT/CN2015/076245.

Nov. 4, 2015 Office Action issued in Chinese Patent Application No. 201410150468.9.

Jun. 28, 2016 Office Action issued in Chinese Patent Application No. 201410150468.9.

* cited by examiner

US 10,316,418 B2

EXCESS MICRO-BUBBLE HYDROGEN PREPARATION DEVICE

BACKGROUND OF THE INVENTION

Technical Field

The present invention relates a hydrogen preparation device, which belongs to the technical field of electrolysis equipment.

Description of the Related Art

Electrolysis of water is widely used for preparing hydrogen (and oxygen) gas. When a DC electrolysis voltage is applied between two electrodes for electrolysis of water, a separation of hydrogen gas at the cathode and separation of oxygen gas at the anode occurs. Methods for preparing hydrogen (oxygen) gas by electrolysis of water usually include electrolysis without an isolating membrane, electrolysis with an isolating membrane, zero-space electrolysis and electrolysis of water using solid polymer electrolytes. At present, to prepare 1 $m^3$ of hydrogen gas through electrolysis of water, the actual power consumption is about 4.5~5.5 kW·h. Theoretically, the actual efficiency of preparing hydrogen through electrolysis of water is about 50%, and the actual efficiency is far lower than the theoretical value (about 20-30%), so that the electrolysis of water is mainly used for preparing high-purity hydrogen gas.

On the other hand, water that is rich in hydrogen gas is a kind of reductive water with a redox potential which is very low and may even be negative. A great amount of domestic and overseas scientific research results show that drinking hydrogen-enriched reductive water can effectively eliminate harmful active oxygen in the human body and is actually good for health.

At present, hydrogen-enriched reductive water can be prepared by many methods, for example, hydrogen gas is injected into the hydrogen(gas)-enriched reductive water in aluminum box type storage containers by high pressure; the hydrogen-enriched reductive water is prepared by the isolating-membrane-free or the isolating-membrane method, the two-electrode method or the three-electrode method; using porous polar substances (for example active carbon) as carriers, the hydrogen-enriched reductive water is prepared by a special absorption-hiding method where hydrogen gas is stored and then slowly released in the water; and concentrated hydrogen-enriched water for special purposes (with the redox potential lower than below −500 mv, and a dissolved hydrogen concentration greater than 1,000 PPB), etc.

However, the methods for preparing hydrogen gas by electrolysis of water have two defects: 1. lots of oxygen gas are generated; 2. the hydrogen gas amount is not sufficient and hydrogen bubbles are large.

BRIEF SUMMARY OF THE INVENTION

The technical problem to be solved by the present invention is to provide an excess microbubble hydrogen preparation device which can generate massive amounts of ultra-micro bubble hydrogen and little oxygen.

To solve the above technical problems, the present invention puts forwards the following technical scheme: an excess microbubble hydrogen preparation includes a water container which is respectively provided with a water inlet and a water outlet; at least one pair of a cathode and an anode are arranged within the water container; a water-permeable porous membrane is clamped between the coupled cathode and anode with no gap; the area of the inside of the water-permeable porous membrane opposite the cathode or the anode is smaller than the area of the inside of the cathode or the anode opposite the water-permeable porous membrane, and the thickness of the water-permeable porous membrane is less than 5 mm.

In the above technical scheme, the water-permeable porous membrane is also called water-permeable membrane or water-permeable isolating membrane, referring to a membrane through which water molecules can pass and with a water-permeable aperture ranging from a millimeter scale to a nanometer scale. Various filtration membranes used for daily water treatment are included, for example: ultra-filtration membrane (UF), nano-filtration membrane (NF) and micro-filtration membrane (MF), etc.

As an improvement of the technical scheme of the present invention, the water-permeable porous membrane has a water-permeable aperture which is smaller than or equal to 2 mm and greater than or equal to 1 nm.

As an improvement of the technical scheme of the present invention, either the cathode or the anode is formed on the surface thereof.

As an improvement of the technical scheme of the present invention, the minimum ratio of the area of the water-permeable porous membrane to the area of the cathode or anode is 4:5-3:5.

As a further improvement of the technical scheme of the present invention, the cathode and anode are powered by a DC power supply.

As a further improvement of the technical scheme of the present invention, the cathode is an inert electrode prepared by round platinum-coated titanium oxides; the anode is an inert electrode prepared by carbon materials such as graphite and active carbon; the water-permeable porous membrane is a round plane ultra-filtration membrane with a mean water-permeable aperture of 0.01-0.05 μm.

As a further improvement of the technical scheme of the present invention, the water-permeable porous membrane is a single-layer or multi-layer membrane.

The excess microbubble hydrogen preparation device of the present invention has the following beneficial effects: microbubbles taking hydrogen gas as the mainstay are capable of being generated during the electrolysis of water. The description of the principles of the beneficial effects can be seen in the related preparation mechanism analysis in the following specific implementation modes.

BRIEF DESCRIPTION OF THE SEVERAL VIEWS OF THE DRAWINGS

The excess microbubble hydrogen preparation device of present invention is described in further detail in conjunction with the attached drawings.

DETAILED DESCRIPTION OF THE INVENTION

Embodiment 1

Figure 1:
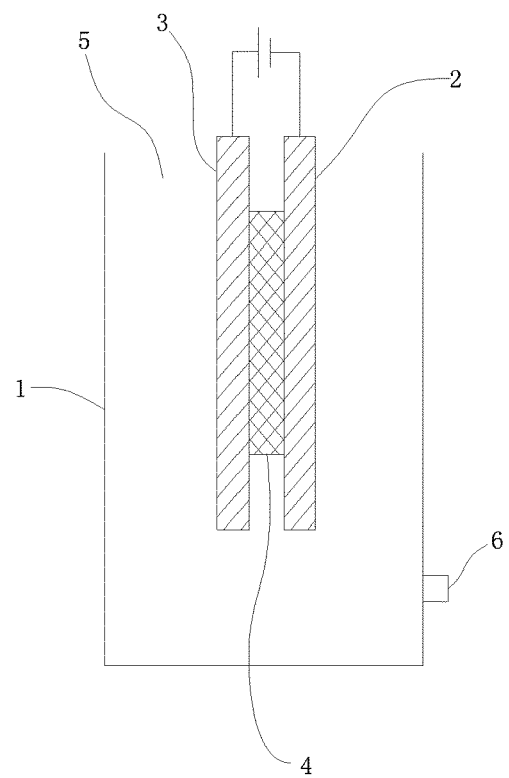
FIG. 1 is a structural view of an excess microbubble hydrogen preparation device according to an embodiment of the present invention.

An excess microbubble hydrogen preparation device of the embodiment can be seen in FIG. 1, comprising a water container 1 which is respectively provided with a water inlet 5 and a water outlet 6. The water container 1 is an open container. A pair of a cathode 2 and an anode 3 is arranged within the water container 1. A water-permeable porous membrane 4 is clamped between the coupled cathode 2 and anode 3 with no gap. The area of the inside of the water-permeable porous membrane 4 opposite the cathode 2 or the anode 3 is smaller than the area of the inside of the cathode 2 or the anode 3 opposite the water-permeable porous membrane 4. In the embodiment, the minimum ratio of area of the water-permeable porous membrane to the area of the cathode or anode is 4:5 (or 3:5). The thickness of the water-permeable porous membrane 4 is 4 mm (usually smaller than 5 mm). The water-permeable porous membrane 4 has a water-permeable aperture which is smaller than or equal to 2 mm and greater than or equal to 1 nm.

In the embodiment, the cathode 2 is an inert electrode prepared by round platinum-coated titanium oxides; the anode 3 is an inert electrode prepared by carbon materials such as graphite and active carbon; the water-permeable porous membrane 4 is a round plane ultra-filtration membrane with a mean water-permeable aperture of 0.01-0.05 μm.

In the embodiment, the cathode 2 and the anode 3 are powered by a DC power supply.

The following is the preparing mechanism analysis of the excess microbubble hydrogen preparation device in embodiment 1.

1. On the outer edge side of the water-permeable porous membrane 4, the cathode 2 and the anode 3 present membrane-less electrolysis, meaning that the hydrogen is separated at the cathode while oxygen is separated at the anode. The gap between the cathode and the anode is very small, so that the electrolysis reaction is usually intense and a very small electrolysis voltage can generate a very large electrolysis current.

2. The water-permeable porous membrane 4 clamped between the hole-less cathode and anode with no gaps (zero-distance) forms a small-sized three-dimensional water storage space consisting of numerous pieces of micro-interspace. Water molecules are limited in each micro-porous space to be electrolyzed. Due to zero-space electrolysis, the process of separating hydrogen at the cathode 2 and separating oxygen at the anode 3 hardly begins, hydrogen and oxygen can only be dynamically stored in the micro-porous space in a free ionic state or are combined and reduced into water and then re-electrolyzed into hydrogen ions and hydroxide ions. After such repeated processes, the water-permeable porous membrane is internally formed with a similar plasma environment (where gaseous state, atomic state and ionic state co-exist) for an intense reaction, resulting in a rise in partial voltage and temperature, and generating a certain pressure difference and a certain temperature difference in comparison with the space between the outer edge of the water-permeable porous membrane 4 and the two electrodes, namely the cathode and anode. Then, hydrogen and oxygen ions limited and co-existing in the micro-porous space in various states disperse along the radial outer side of the water-permeable porous membrane 4, participating in the membrane-less electrolysis reaction which occurs in the space between the outer edge of the water-permeable porous membrane 4 and the two electrodes.

3. With the participation of ions dispersing from the water-permeable porous membrane 4, the membrane-less electrolysis reaction in the space between the outer edge of the water-permeable porous membrane 4 and the two electrodes, namely the cathode and the anode, is more intense. The hydrogen molecules are very small and more easily obtain cathode electrons during the intense reaction to change into hydrogen gas and escape, generating hydrogen gas (bubbles) far more than hydrogen gas (bubbles) generated by the conventional electrolysis methods in water.

4. The carbon material itself of the anode 3 has a strong absorption capability, so oxidation factors generated in water are greatly reduced and oxygen gas generated is greatly reduced.

From the above analysis it is known that, in the embodiment, the excess microbubble hydrogen preparation device can generate a great amount of microbubbles taking hydrogen gas as the mainstay in water.

Embodiment 2

Figure 2:
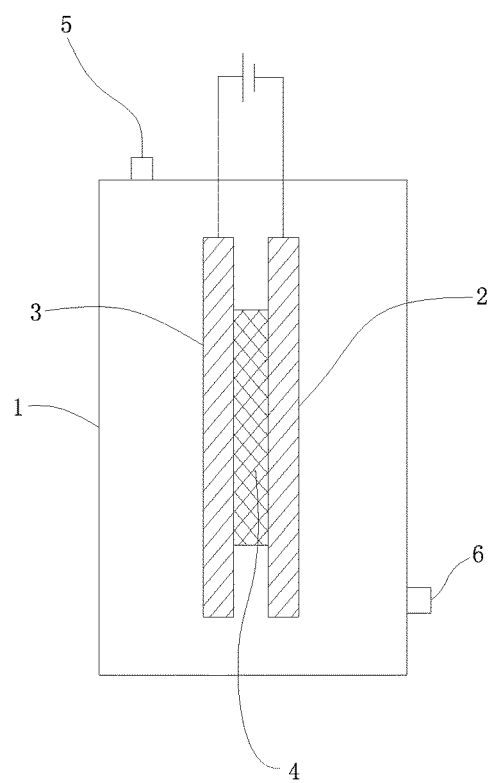
FIG. 2 is a schematic view of a variable structure of an excess microbubble hydrogen preparation device according to an embodiment of the present invention.

As shown in FIG. 2, an excess microbubble hydrogen preparation device in embodiment 2 is different from that in embodiment 1 in that: 1) either a cathode 2 or an anode 3 is formed with on the surface thereof; 2) the water container 1 is a closed container.

The excess microbubble hydrogen preparation device of the present invention is not limited by the specific technical schemes of the above embodiments, for example, 1) two or more pairs of cathodes 2 and anodes 3 can be arranged; 2) the water-permeable porous membrane 4 may be formed by superposing two or more layers of ultra-filtration membranes; 3) the shape of the ultra-filtration membrane may be square, etc. Technical schemes made by equivalent substitutions all fall within the protective scope of the claims of the present invention.

What is claimed is:

1. An excess micro-bubble hydrogen preparation device, comprising:
    a water container which is respectively provided with a water inlet and a water outlet;
    at least one pair of a cathode and an anode being arranged within the water container; and
    a water-permeable porous membrane clamped between the cathode and anode with no gap, the water-permeable porous membrane allowing water, oxygen ions and hydrogen ions to pass therethrough from the cathode to the anode, and vice versa;
    wherein a surface area of a side of the water-permeable porous membrane facing a side of the anode or cathode is smaller than a surface area of a side of the anode or cathode facing towards the water-permeable porous membrane and a thickness of the water-permeable porous membrane is less than 5 mm,
    the water-permeable porous membrane has a first side surface that is in direct contact with a side surface of the anode and a second side surface that is in direct contact with a side surface of the cathode, and
    the first side surface and the second side surface of the water-permeable porous membrane have a dimension smaller than those of the side surface of the anode and the side surface of the cathode, and the water-permeable membrane is located at central portions of the side surface of the anode and the side surface of the cathode, with a peripheral portion of the side surface of the anode and a peripheral portion of the side surface of the cathode facing each other via a gap having a thickness equal to the thickness of the water-permeable porous membrane and with no portion of the water-permeable membrane there between.

2. The excess micro-bubble hydrogen preparation device according to claim 1, wherein the water-permeable porous membrane has a water-permeable aperture which is smaller than or equal to 2 mm and greater than or equal to 1 nm.

3. The excess micro-bubble hydrogen preparation device according to claim 1, wherein either the cathode or the anode is formed with pores on the surface thereof.

4. The excess micro-bubble hydrogen preparation device according to claim 1, wherein a ratio of the surface area of the water-permeable porous membrane to the surface area of the cathode or the surface area of the anode has a minimum value of 4:5-3:5.

5. The excess micro-bubble hydrogen preparation device according to claim 1, wherein the cathode and anode are powered by a DC power supply.

6. The excess micro-bubble hydrogen preparation device according to claim 1, wherein the cathode is an inert electrode prepared by platinum-coated titanium oxides; the anode is an inert electrode prepared by carbon materials; the water-permeable porous membrane is a plane ultra-filtration membrane with a mean water-permeable aperture of 0.01-0.05 µm.

7. The excess micro-bubble hydrogen preparation device according to claim 1, wherein the water-permeable porous membrane is a single-layer or multi-layer membrane.

8. The excess micro-bubble hydrogen preparation device according to claim 2, wherein the cathode and anode are powered by a DC power supply.

9. The excess micro-bubble hydrogen preparation device according to claim 3, wherein the cathode and anode are powered by a DC power supply.

10. The excess micro-bubble hydrogen preparation device according to claim 4, wherein the cathode and anode are powered by a DC power supply.

11. The excess micro-bubble hydrogen preparation device according to claim 2, wherein the cathode is an inert electrode prepared by platinum-coated titanium oxides; the anode is an inert electrode prepared by carbon materials; the water-permeable porous membrane is a plane ultra-filtration membrane with a mean water-permeable aperture of 0.01-0.05 µm.

12. The excess micro-bubble hydrogen preparation device according to claim 3, wherein the cathode is an inert electrode prepared by platinum-coated titanium oxides; the anode is an inert electrode prepared by carbon materials; the water-permeable porous membrane is a plane ultra-filtration membrane with a mean water-permeable aperture of 0.01-0.05 µm.

13. The excess micro-bubble hydrogen preparation device according to claim 4, wherein the cathode is an inert electrode prepared by platinum-coated titanium oxides; the anode is an inert electrode prepared by carbon materials; the water-permeable porous membrane is a plane ultra-filtration membrane with a mean water-permeable aperture of 0.01-0.05 µm.

* * * * *